United States Patent [19]

Akasaka

[11] Patent Number: 4,542,857
[45] Date of Patent: Sep. 24, 1985

[54] FOOD PROCESSOR

[76] Inventor: Chosei Akasaka, 5-4-35-903 Minami-Aoyama, Minato-ku Tokyo, Japan

[21] Appl. No.: 469,637

[22] Filed: Feb. 25, 1983

[30] Foreign Application Priority Data

Mar. 8, 1982 [JP] Japan .................................. 57-36071
May 14, 1982 [JP] Japan .................................. 57-81092

[51] Int. Cl.⁴ ............................................ B02C 18/22
[52] U.S. Cl. ..................................... 241/37.5; 241/92; 241/278 R; 241/282.1
[58] Field of Search ................... 241/37.5, 92, 278 R, 241/282.1, 282.2

[56] References Cited

U.S. PATENT DOCUMENTS 2,678,073  5/1954  De Nardis .............................. 241/92
4,226,374 10/1980  Kafka .................................. 241/92 X
4,397,427  8/1983  Howard ............................... 241/92 X
4,471,915  9/1984  Levin et al. ........................ 241/37.5

Primary Examiner—Howard N. Goldberg
Assistant Examiner—Joseph M. Gorski
Attorney, Agent, or Firm—Lucas & Just

[57] ABSTRACT

A food processor having many good practical effects. A cover put on a food processor body detachably is provided with a larger-diameter inlet port, into which the food to be cut having a large diameter can be inserted without any trouble of cutting it into smaller pieces beforehand, in addition to a regular-size inlet port, into which the food to be cut having a regular size is to be inserted. These inlet ports are so safely formed that the hand or the fingertips cannot be inserted thereinto from the outside. In this food processor, not only a regular-size material but also a large-size (large-diameter) material, which cannot be inserted into the regular-size inlet port, but which can be inserted as it is into the additionally-formed inlet port, can be cut therein.

10 Claims, 7 Drawing Figures 4,542,857

FOOD PROCESSOR

BACKGROUND OF THE INVENTION

A known food processor is provided with only one regular-size inlet port, into which the food, such as a potato, a tomato, an onion or the like having a regular size is inserted. When the food to be inserted into the inlet port of such a food processor so as to be cut therein has so large a diameter that the food cannot be inserted as it is into the inlet port, the food is cut to a regular size before being inserted thereinto.

The present invention is directed to a food processor having many practical advantages, which is provided in addition to a regular-size inlet port with another inlet port, into which the food to be cut having a larger size (diameter) can be inserted as it is, to thereby save the trouble of cutting such food to a regular size, the larger inlet port being so safely constructed just as the regular-size inlet port for the food having a regular size that the larger inlet port does not permit the hand and the fingers to be inserted thereinto from the outside.

SUMMARY OF THE INVENTION

An object of the present invention is to provide an improvement in a food processor for use in slicing to a predetermined thickness, grating, or processing to an arbitrary form the fruit, vegetable, meat, or some other general food.

Another object of the present invention is to provide a practically convenient food processor of a novel construction, which permits the food to be treated having a regular size and the food to be treated having a larger size to be inserted into different-sized inlet ports, which can be switched from one to the other, whereby even the food having a larger size can be inserted as it is without being cut as in a conventional food processor, into an inlet port of a larger diameter, which is other than the other regular-size inlet port.

Still another object of the present invention is to provide a food processor having inlet ports of different diameters, into which various kinds of foods are inserted, each of which inlet ports is formed cylindrically and opened in an upper wall of a cover in such a manner that each of the inlet ports has limited height and width so as not to permit the hand and the fingers to reach a surface of a cutter, whereby the food processor can be handled safely.

A further object of the present invention is to provide a perfectly safe food processor having a cylindrical inlet port, into which the food having a larger diameter is inserted, in addition to a regular-size inlet port, the larger inlet port being formed cylindrically so as not to permit the hand or the fingers to be inserted thereinto from the outside while the food processor is in use.

The above and other objects as well as advantageous features of the invention will become apparent from the following description of the preferred embodiments taken in conjunction with the accompanying drawings.

DESCRIPTION OF THE PREFERRED EMBODIMENTS

The present invention is directed to an improvement in a food processor, which permits even a large-size material, which is to be cut therein, to be inserted thereinto as it is, and processed in a desired manner. In order to prevent an accident from occurring in an inlet port, into which a material to be cut is inserted, it is necessary that the width of a mouth thereof be limited to so low a level that the inlet port does not permit the hand to enter the same and reach a cutter, and that the height of the inlet port be limited to so low a level that the inlet port does not permit the fingers to reach the cutter. Accordingly, it is unavoidable to narrow the inlet port. When the inlet port is formed to such limited sizes, a potato, a tomato or the like having a diameter of not less than a certain level could not be inserted thereinto. In the food processor according to the present invention, the above-mentioned inconveniences are eliminated; it has a safe construction and permits the above-mentioned foods to be inserted into the inlet port thereof freely irrespective of the cross-sectional areas thereof.

Figure 1:
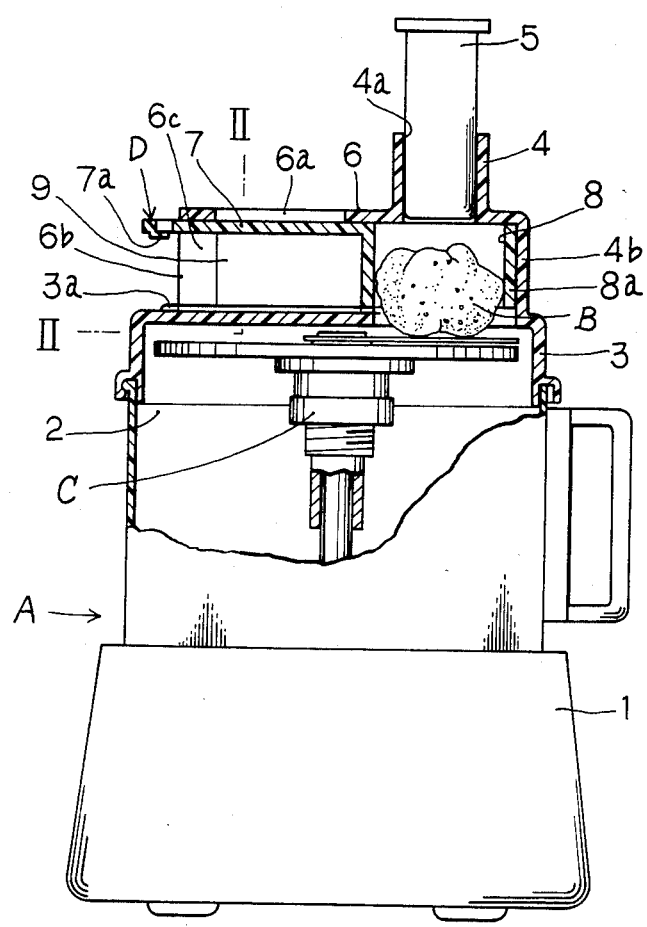
FIG. 1 is a partially cutaway view in front elevation of an embodiment of the present invention, showing a principal portion thereof in section.
Figure 2:
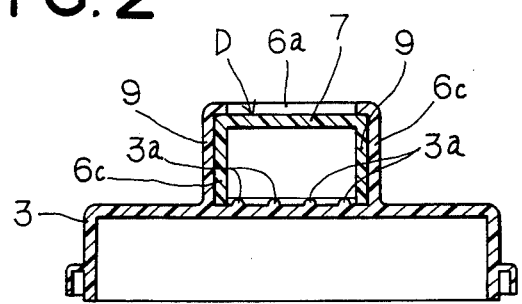
FIG. 2 is a sectional view of the food processor storage unit and guide box.
Figure 3:
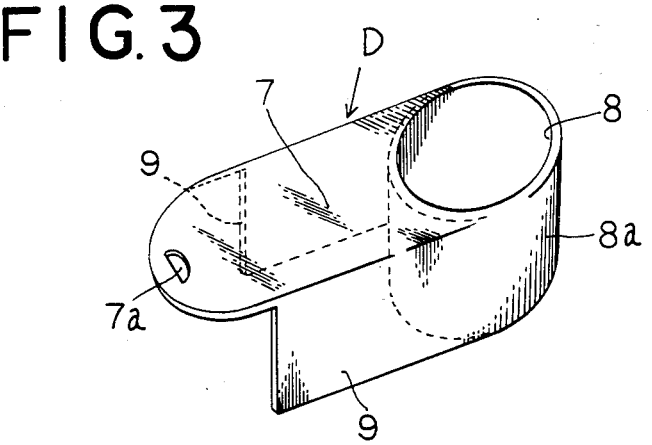
FIG. 3 is a perspective view of the food processor separately formed withdrawable storage unit slider.

An embodiment of the present invention will now be described with reference to the drawings. Reference letter A denotes a food processor, in which an inlet port for a material B to be cut is formed cylindrically 4 on an upper wall of a cover 3, with which an opening 2 of a food processor body 1 is closed. An opening 4a of the inlet port 4 is formed to such a diameter that the opening 4a does not permit the hand to be inserted thereinto. In general, the inlet port 4 is formed integrally with the food processor body 1 to such a height that the cylindrical inlet port 4 does not permit the hand to reach a cutter C provided in the food processor body 1. According to the present invention, the cylindrical inlet port 4 has a lower end portion having a larger diameter 4b, which is close to an upper surface of the cover 3. The food having a regular size is inserted into the opening 4a, and a pusher 5 is also adapted to be inserted thereinto. Reference numeral 6 denotes a guide box formed integrally with the cylindrical inlet port 4 and provided with an inlet port 6a. The guide box 6 is formed polygonally, which is communicated at one end thereof with the larger-diameter portion 4b of the pusher-inserting cylindrical inlet port 4, and which is opened at the other end thereof to form an opening 6b. The guide box 6 shown in the drawings is formed rectangularly. The larger-diameter cylindrical portion 4b, cylindrical inlet port 4 and guide box 6 are formed integrally with the upper wall of the cover 3, or independently thereof and fixed thereto. Reference letter D denotes a separately-formed withdrawable storage unit having a larger-diameter bore for holding the food to be cut, which has a larger size, i.e. a larger diameter. The storage unit D consists of as shown in FIG. 2 a handle body 7, and a larger-diameter port 8, into which the material B to be cut is inserted, provided at one end of the handle body 7. The larger-diameter inlet port 8 is formed cylindrically with upper and lower ends thereof opened. The inlet port 8 is surrounded by a circumferential wall 8a so as to prevent the hand from entering the same. The larger-diameter inlet port 8 has a diameter in agreement with that of the inlet port 6a formed in the guide box 6. Reference numeral 9 denotes side plates formed integrally at one end thereof with the circumferential wall 8a of the larger-diameter inlet port 8. The side plates 9 contact side plates 6c of the guide box 6 when the storage unit D is inserted into or withdrawn from the guide box 6, and thereby serve as guide plates. Reference numeral 7a denotes a catch provided in an upper wall of the handle body 7. The finger is hooked on the catch 7a to draw the handle body 7, or the catch 7a is gripped by the fingers to draw the handle body 7. That portion of the cover 3 which is opposed to a lower surface of the guide box 6 is provided with ridges and grooves 3a extending laterally toward the larger-diameter portion 4b of the cylindrical inlet port 4, to allow a surface, which is to be cut, of the food to be slided easily.

Figure 4:
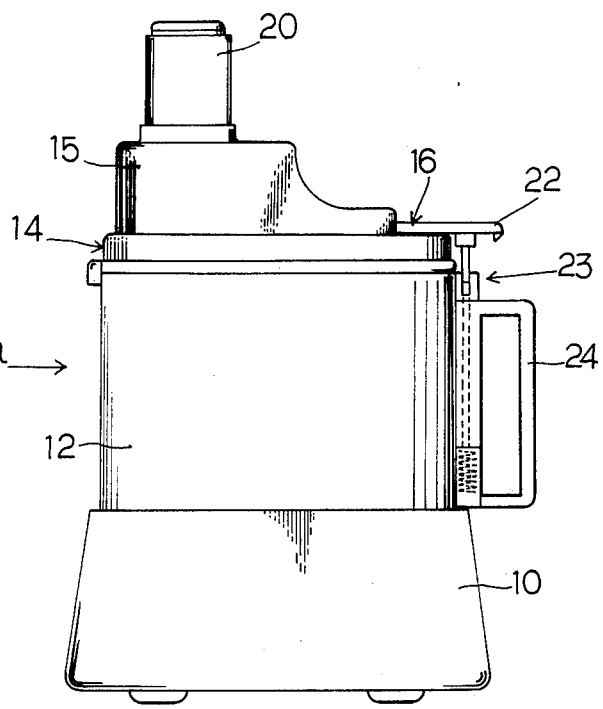
FIG. 4 is a front elevational view of another embodiment as a whole of the present invention.
Figure 5:
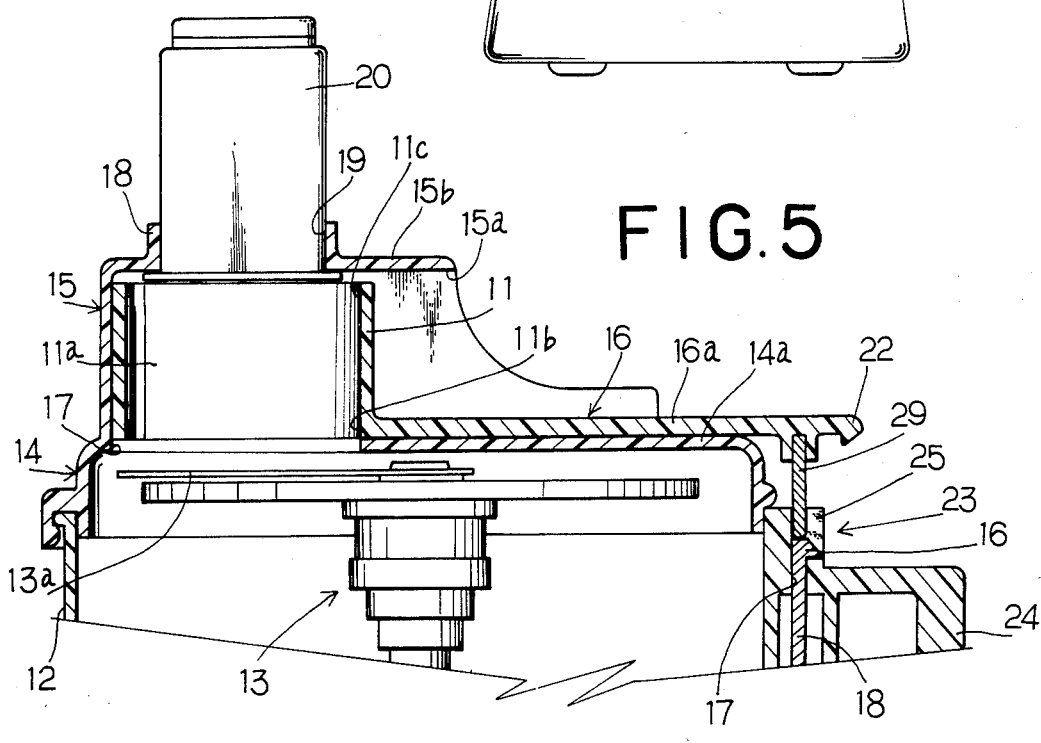
FIG. 5 is an enlarged longitudinal sectional view of a principal portion of the embodiment shown in FIG. 4.
Figure 6:
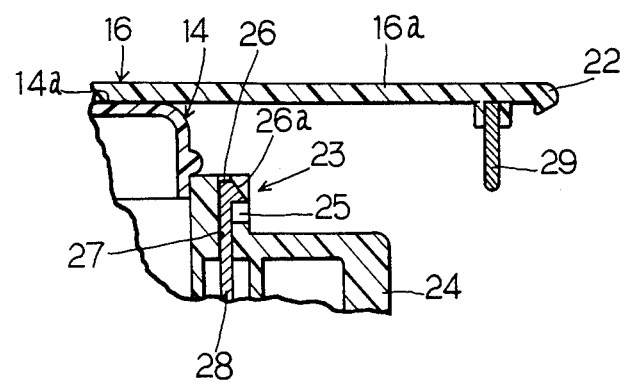
FIG. 6 is an enlarged longitudinal sectional view of a part of the embodiment shown in FIG. 4, illustrating an operation thereof.
Figure 7:
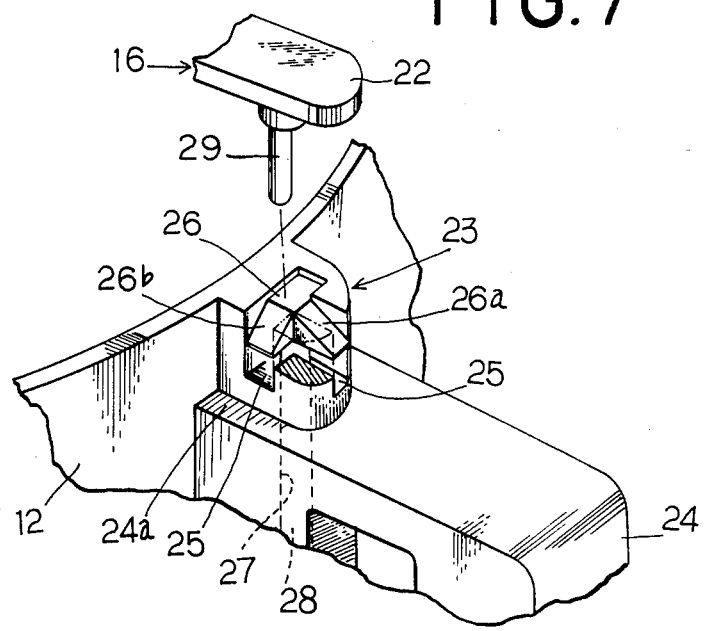
FIG. 7 is a perspective view of a button switch in the embodiment shown in FIG. 4.

FIGS. 4–7 show another embodiment of the present invention. FIG. 4 is a side elevational view of a food processor as a whole, in which a slider is in a forward position to show that a switch is in "ON" state. FIG. 5 is an enlarged longitudinal sectional view of a principal portion of the food processor shown in FIG. 4. FIG. 6 is a sectional view of a switch button and a part of a slider, which is in a backward position. FIG. 7 is a partially cutaway fragmentary perspective view of the switch button and slider.

A food processor Aa consists of a base 10 containing a driving element therein, a container body 12 placed detachably on the base 10, a rotatable cutter-driving element 13 disposed vertically in the container body 12 and connected to the driving element in the base 10, a cover 14, which is fitted loosely around an upper open end of the container body 12 so as to cover therewith a surface, formed in a plane including the upper open end of the container body 12, of a cutter, and which is rotatable with respect to the container body 12, and a slider 16 fitted into a box portion 15 of the cover 14 in such a manner that the slider 16 can be moved slidingly on an upper surface of the cover 14 in the direction of the diameter thereof. In an upper wall 14a of the cover 14, the box portion 15 is formed to a predetermined height in such a manner that the box portion 15 is bent outward in the direction of its diameter passing the center thereof. The box portion 15 is provided with an opening 15a at one diametrical end thereof. The box portion 15 is also provided therein with a lower large inlet port 17 extending through, and having a diameter substantially equal to the radius of, an upper wall 14a of the cover 14, and the inlet port 17 is opened above a plane, in which a cutter 13a mounted on the cutter-driving element 13 is rotated. A smaller-diameter cylindrical inlet port 18 is formed integrally with an upper wall 15b of the box portion 15 in such a manner that the inlet port 18 is concentric with the lower inlet port 17. The inlet port 18 has at an upper end thereof an upper opening 19, the diameter of which is equal to that thereof.

In general, a pusher 20 fitted into the cylindrical inlet port 18 from the upper opening 19 is supported in such a manner that the pusher can be moved vertically to press against the surface of the cutter 13a the food B inserted into a hollow above the plane, in which the cutter 13a is rotated. The slider 16 is provided with a cylindrical inlet port 11 of a larger diameter, which is formed integrally therewith, and which extends from the central portion of a flat section 16a thereof to one outer end thereof. The cylindrical inlet port 11 is opened at the upper and lower ends thereof, so that, when the slider 16 is in a forward position, the hollow 11a in the larger-diameter inlet port 11 is communicated with the upper opening 19 and lower inlet port 17. The slider 16 is further provided with a grip 22, which extends from the central portion of the flat section 16a to the other outer end thereof and projects beyond the outer end of the cover 14. The grip 22 is adapted to be held by the hand for moving the slider 16 forward and backward. The slider 16 is thus formed retractably in such a manner that the slider 16 can be moved into and withdrawn from the box portion 15 along an upper surface of the upper wall 14a of the cover 14. When the slider is withdrawn out of the box portion 15, a lower opening 11b of the larger-diameter inlet port 11 is closed with the upper wall 14a of the cover 14, so that the upper wall 14a forms a bottom of the inlet port 11. In the meantime, an upper opening 11c is exposed to the outside of the box portion 15 to allow the food B having a larger diameter to be inserted and held as it is in the interior 11a of the inlet port 11. When the slider 16 is forced into the box portion 15 after the food has thus been placed in the interior 11a of the inlet port 11, the food B is moved into the box portion 15 as shown in FIG. 5, to be fed to the plane, in which the cutter 13a is rotated. Consequently, the food B can be pressed by the pusher 20 and processed just as the regular-size food. Since the larger-diameter inlet port 11 is communicated with the lower inlet port 17 and upper opening 19 when the slider 16 is in a forward position, smaller-size food can be inserted from the upper opening 19 with the slider 16 left in the same position, to be processed in the same manner. Thus, the two inlet ports 17, 19 can be used as they are switched from one to the other in accordance with the size of the food B. Moreover, while the larger inlet port is in use, it is always opened within the box portion 15, i.e. not exposed to the outside but surrounded by a cylindrical wall, so that the hand and the fingers do not enter the same. Accordingly, this food processor can be used safely, and the user is not hurt by the device in operation.

Reference numeral 23 denotes a switch button unit, which is shown in FIG. 7. The switch button unit 23 is provided at a base end portion 24a of a handle 24, which is fastened to the container body 12, in such a manner that the switch button unit 23 is opposed to the grip 22 of the slider 16. The switch button unit 23 is provided with a guide groove 25, which is substantially in the shape of the letter "L" in plan. The guide groove 25 is formed to a predetermined depth in such a manner that an upper end and two outer ends thereof face in the direction, in which the slider 16 is withdrawn, and in the direction, in which the cover 14 is rotated, to be opened in an outer circumferential surface of the switch button unit 23. A switch button 26 having the same shape in plan as the guide groove 25 is so provided therein that the switch button 26 can be moved up and down within the depth of the guide groove 25.

A shaft bore 27 extending to an electric contact is provided generally in that section of the base end portion 24a of the handle 24 which is under the L-shaped guide groove 25. A vertically movable rod 28 inserted in the shaft bore 27 and switch button 26 are connected together in such a manner that the switch button 26 is turned on when the rod 28 is moved downward, and turned off when the rod 28 is moved upward. The switch button 26 is provided on an upper surface thereof with guide tapers 26a, 26b as shown in FIGS. 6 and 7, the height of these guide tapers 26a, 26b decreasing gradually toward the outer ends thereof. The grip 22 of the slider 16 is provided on a lower surface thereof with a pressing rod 29 projecting downward therefrom, which is adapted to turn on and off the switch button 26. A part of the guide groove 25 is extended in the direction, in which the slider 16 is withdrawn. Accordingly, when the slider 16 is forced into the box portion 15 to the foremost position, the pressing rod 29 is moved slidingly to the guide taper 26a to press the switch button 26 downward and turn on the same. While the slider 16 is moved forward and backward, the switch button 26 is turned on and off alternately. When the switch button 26 is in "ON" state, the food can be processed continuously as mentioned previously, by using the opening 19 having a regular size or a smaller diameter. When the cover 14 is turned with respect to the container body 12, the switch button 26 is turned on and off in the same manner as in the above-mentioned case. Therefore, the cover 14 can be attached and detached easily with the pusher 20 left fitted into the opening 19, and with the slider 16 left in an operational position. Especially, when a part of the food has unexpectedly enters a space between the plane, in which the cutter 13a is rotated and the slider 16, it is necessary that the slider 16 be withdrawn. If the cover 14 is turned without removing the pusher 20 and without withdrawing the slider 16, the switch button 26 is turned off, and the cover 14 can be removed. Thus, the extraneous matter can be removed easily.

The pusher 20 may consist of a plurality of parts having gradually varying sizes, fitted within one another and capable of being disassembled, or a unitary structure.

According to the present invention constructed as described above, both the smaller inlet port, which is identical with the inlet port of a conventional food processor of this kind, and the larger inlet port provided in the slider can be used by switching one to the other arbitrarily in accordance with the sizes of the food to be inserted into the food processor. This allows the food to be processed conveniently in practice. Since the larger inlet port is formed cylindrically and contained in the box portion of the cover so as not to be exposed to the outside, the hand and the finger-tips do not contact the cutter. Therefore, the food processor according to the present invention can be used as safely as a conventional food processor of this kind. In addition, the switch in the present invention can be operated in both the direction, in which the slider is moved forward and backward, and the direction, in which the cover is turned. Accordingly, the opening and closing of the cover, which has heretofore been considered difficult in a food processor having a slide-fitting part, can be carried out simply and safely. Thus, the food processor according to the present invention permits removing the extraneous matter therefrom easily, and omitting various steps, which are carried out in a conventional food processor of this kind after the food has been processed therein. In fact, the food processor according to the present invention can be used conveniently. The above are the great characteristics of the present invention.

The present invention is not, of course, limited to the above embodiments; it may be modified in various ways within the scope of the appended claims.

What is claimed is:

1. A food processor including a cover comprising:
   (a) a first inlet port in an upper wall of said cover;
   (b) said cover having a guide box, said guide box having an interior in communication with said first inlet port and said guide box having an upper wall, a lower wall and side walls, said upper wall of said guide box being part of said upper wall of said cover;
   (c) a second inlet port in said upper wall of said guide box, said second inlet port being adjacent to said first inlet port and having a width larger than a width of said first inlet port;
   (d) a third inlet port of said cover, said third inlet port having a width slightly greater than said width of said second inlet port, said third inlet port being coaxial and in communication with said first port;
   (e) a separate slidable withdrawable storage unit which slides inside said guide box, said storage unit having a handle at one end of said unit and a fourth inlet port at another end of said unit, said fourth inlet port having a width substantially equal to said width of said second inlet port and said unit having right and left side plates for guiding said unit from a first position to a second position, so that when said unit is at said second position said fourth inlet port is aligned with said first inlet port and coincides with said third inlet port, and when said unit is at said first position said fourth inlet port is aligned only with said second inlet port; and
   (f) a pusher for urging material through said third inlet port and onto a rotatable blade.

2. A food processor including a cover according to claim 1 wherein said lower wall of said guide box has ridges and grooves extending laterally toward said first inlet port, to allow a material to be moved smoothly toward said third inlet port.

3. A food processor including a cover according to claim 1 wherein said fourth inlet port is opened at upper and lower ends and is surrounded by a circumferential wall.

4. A food processor including a cover comprising:
   (a) a first inlet port in an upper wall of said cover;
   (b) said cover having a guide box, said guide box having an interior in communication with said first inlet port and said guide box being a polygonal structure and having an upper wall, a lower wall and side walls, said upper wall of said guide box being part of said upper wall of said cover;
   (c) a second inlet port in said upper wall of said guide box, said second inlet port being adjacent to said first inlet port and having a width larger than a width of said first inlet port;
   (d) a third inlet port of said cover, said third inlet port having a width slightly greater than said width of said second inlet port, said third inlet port being coaxial and in communication with said first inlet port;
   (e) a separate slidable withdrawable storage unit which slides inside said guide box, said storage unit having a handle at one end of said unit and a fourth inlet port at another end of said unit, said fourth inlet port having a width substantially equal to said width of said second inlet port and said unit having right and left side plates for guiding said unit from a first position, to a second position so that when said unit is at said second position said fourth inlet port is aligned with said first inlet port and coincides with said third inlet port, and when said unit is at said first position said fourth inlet port is aligned only with said second inlet port, said guide box being unable to be moved pivotally when said slider is moved between said first and said second position; and (f) a pusher for urging material through said third inlet port and onto a rotatable blade.

5. A food processor including a cover according to claim 4 wherein said lower wall of said guide box has ridges and grooves extending laterally toward said first inlet port, to allow a material to be moved smoothly toward said third inlet port.

6. A food processor including a cover according to claim 4 wherein said fourth inlet port is opened at upper and lower ends and is surrounded by a circumferential wall.

7. A food processor including a cover comprising:
(a) a first inlet port in an upper wall of said cover;
(b) said cover having a guide box, said guide box having an interior in communication with said first inlet port and said guide box having an upper wall, a lower wall and side walls, said upper wall of said guide box being part of said upper wall of said cover;
(c) a second inlet port in said upper wall of said guide box, said second inlet port being adjacent to said first inlet port and having a width larger than a width of said first inlet port;
(d) a third inlet port of said cover, said third inlet port having a width slightly greater than said width of said second inlet port, said third inlet port being coaxial and in communication with said first inlet port;
(e) a separate slidable withdrawable storage unit which slides inside said guide box, said storage unit having a handle at one end of said unit and a fourth inlet port at another end of said unit, said fourth inlet port having a width substantially equal to said width of said second inlet port and said unit having right and left side plates for guiding said unit from a first position to a second position, so that when said unit is at said second position said fourth inlet port is aligned with said first inlet port and coincides with said third inlet port, and when said unit is at said first position said fourth inlet port is aligned only with said second inlet port, said third inlet port having its width being slightly greater than said width of said fourth inlet port to thereby allow said fourth inlet port to fit into and coincide with said third inlet port; and
(f) a pusher for urging material through said third inlet port and onto a rotatable blade.

8. A food processor including a cover according to claim 7 wherein said guide box has ridges and grooves extending laterally toward said first inlet port, to allow a material to be moved smoothly toward said third inlet port.

9. A food processor including a cover according to claim 7 wherein said fourth inlet port is opened at upper and lower ends and is surrounded by a circumferential wall.

10. A food processor including a cover comprising:
(a) a first inlet port in an upper wall of said cover;
(b) said cover having a guide box, said guide box having an interior in communication with said first inlet port and said guide box having an upper wall, a lower wall and side walls, said upper wall of said guide box being part of said upper wall of said cover;
(c) a second inlet port in said upper wall of said guide box, said second inlet port being adjacent to said first inlet port and having a width larger than a width of said first inlet port;
(d) a third inlet port of said cover, said third inlet port having a width slightly greater than said width of said second inlet port, said third inlet port being coaxial and in communication with said first inlet port;
(e) a separate slidable withdrawable storage unit which slides said guide box, and storage unit having a handle at one end of said unit and a fourth inlet port at another end of said unit, said fourth inlet port having a width substantially equal to said width of said second inlet port and said unit having right and left side plates for guiding said unit from a first position to a second position, so that when said unit is at said second position said fourth inlet port is aligned with said first inlet port and coincides with said third inlet port, and when said unit is at said first position said fourth inlet port is aligned only with said second inlet port;
(f) a guide groove for a pressing rod, said guide groove being provided on the food processor, said guide groove having a portion extending along a width of said cover, and a portion extending perpendicular to said width of said cover;
(g) a vertically-movable change-over switch button provided in said guide groove and adapted to turn on and off a rotatable blade; and
(h) a pusher for urging material through said third inlet port and onto said rotatable blade.

* * * * *